United States Patent [19]

Hendi et al.

[11] Patent Number: 5,457,203
[45] Date of Patent: Oct. 10, 1995

[54] PIGMENTARY SYNTHESIS OF QUINACRIDONE SOLID SOLUTIONS

[75] Inventors: Shivakumar B. Hendi, Newark; Edward E. Jaffe, Wilmington, both of Del.

[73] Assignee: Ciba-Geigy Corporation, Ardlsey, N.Y.

[21] Appl. No.: 122,025

[22] Filed: Sep. 15, 1993

[51] Int. Cl.$^6$ .................................................. C09B 48/00
[52] U.S. Cl. ............................................ 546/56; 546/49
[58] Field of Search ................................. 546/49, 56

[56] References Cited

U.S. PATENT DOCUMENTS

| | | | |
|---|---|---|---|
| 2,821,529 | 1/1958 | Struve | 546/49 |
| 3,160,510 | 12/1964 | Ehrich . | |
| 3,275,637 | 9/1966 | West | 546/56 |
| 3,607,336 | 9/1971 | Jaffe . | |
| 3,681,100 | 8/1972 | Jaffe . | |
| 4,197,404 | 4/1980 | Johnson | 546/49 |
| 4,298,398 | 11/1981 | Fitzgerald . | |
| 4,455,173 | 6/1984 | Jaffe | 546/56 |
| 4,541,872 | 9/1985 | Jaffe | 546/57 |
| 4,895,949 | 1/1990 | Jaffe et al. | 546/56 |
| 5,084,100 | 1/1992 | Bauman | 106/495 |
| 5,093,497 | 3/1992 | Schutze et al. | 546/49 |
| 5,286,863 | 2/1994 | Babler et al. | 546/49 |

FOREIGN PATENT DOCUMENTS

| | | |
|---|---|---|
| 0005375 | 11/1979 | European Pat. Off. . |
| 0530142 | 3/1993 | European Pat. Off. . |
| 544160 | 6/1993 | European Pat. Off. . |
| 0094334 | 8/1978 | Japan .................... 546/49 |

*Primary Examiner*—Donald G. Daus
*Attorney, Agent, or Firm*—George R. Dohmann

[57] ABSTRACT

A general method for the direct preparation of pigmentary quinacridone solid solutions is disclosed. The disclosed process comprises oxidizing a mixture of dihydroquinacridones directly to a pigmentary quinacridone solid solution wherein the oxidation is carried out by heating a reaction mixture comprising the dihydroquinacridone mixture, an alkali metal hydroxide, a water miscible organic solvent, water and effective mounts of an oxidizing agent and a particle growth inhibitor. In addition, an analogous process useful for the direct pigmentary synthesis of α-quinacridone is disclosed. The pigments prepared by the disclosed processes do not require additional particle-size reducing after treatments in order to be useful as pigments.

20 Claims, No Drawings

PIGMENTARY SYNTHESIS OF QUINACRIDONE SOLID SOLUTIONS

BACKGROUND

The quinacridone family of pigments and their pigmentary properties are well known. The pigmentary quinacridones include the parent compound, quinacridone, and various disubstituted quinacridones.

In addition, solid solution pigments of several combinations of quinacridones are known for their improved photochemical and thermal stability. U.S. Pat. No. 3,160,510, which is here incorporated by reference, describes the phenomenon of solid solutions, their X-ray diffraction patterns, and preparative procedures.

It is well known in the pigments art that unsubstituted and substituted quinacridone pigments can be prepared by the oxidation of the corresponding dihydroquinacridones. The product of such an oxidation, known as a crude quinacridone, is generally unsuitable for use as a pigment because of its large particle size. The crude pigment must be further processed in order to develop the requisite pigmentary properties, such as particle size, particle shape, polymorphic phase and tinctorial strength.

The crude quinacridone is commonly converted to a pigmentary form by milling the crude quinacridone with large quantities of inorganic salt and then extracting the resulting mill powder, or by dissolving the pigment in large quantities of concentrated sulfuric acid and drowning the solution into water (acid pasting). Since these multistep procedures generally require a diversity of operations conducted at elevated temperatures in acidic environments, simpler, more economical procedures for preparing pigmentary quinacridones are highly desirable.

Pigmentary quinacridone solid solutions are also generally prepared by laborious, multistep procedures. One method involves dissolving the crude components in concentrated sulfuric acid and then precipitating the solid solution by drowning into water under high turbulence followed by ripening at elevated temperatures. The pigmentary solid solutions of quinacridones have also been prepared by a variety of milling procedures.

The present invention relates to the discovery that pigmentary quinacridone solid solutions are prepared directly if mixed dihydroquinacridones, which correspond to quinacridones capable of forming a solid solution, are simultaneously co-oxidized in the presence of a sufficient quantity of a particle growth inhibitor to yield the pigmentary composition directly; without the need for additional particle size reducing after treatments. This is surprising because solid solutions are not formed if the oxidation is carried out in the absence of the particle growth inhibitor or if the dihydroquinacridones are not simultaneously co-oxidized.

The inventive process provides a simple, economically attractive and ecologically advantageous means for the direct manufacture of a variety of pigmentary quinacridone solid solutions. In addition, the approach used by the inventive process eliminates the current multistep, labor intensive procedures used for the manufacture of pigmentary/quinacridone solid solutions.

An additional aspect of this application relates to the discovery that greater than 1% of a phthalimidomethylquinacridone particle growth inhibitor does not inhibit the oxidation of dihydroquinacridones, if the oxidation is carried out in a sufficiently basic medium, for example, under the conditions needed to oxidize unsubstituted dihydroquinacridone to a polymorph other than 7-quinacridone, or under the conditions needed to oxidize the disubstituted dihydroquinacridones, especially 2,9-dichloro-6,13-dihydroquinacridone. Since it is known from U.S. Pat. No. 4,197,404 that the oxidation of β-dihydroquinacridone to γ-quinacridone was inhibited when more than 1 percent of o-carboxybenzamidomethylquinacridone, which is a hydrolysis product of 2-phthalimidomethylquinacridone, was utilized as a particle growth inhibitor, it is surprising that the oxidation of dihydroquinacridones to the corresponding quinacridones under the present reaction conditions is not inhibited by the quantity of phthalimidomethylquinacridone particle growth inhibitor sufficient to effect direct preparation of pigmentary products. This discovery permits the phthalimidomethylquinacridones to be used as particle growth inhibitors for the direct preparation of pigmentary α-quinacridone, as well as for the direct preparation of pigmentary quinacridone solid solutions.

SUMMARY

This invention relates to the discovery that the simultaneous co-oxidation of a mixture of dihydroquinacridones, which correspond to quinacridones capable of forming a solid solution, in the presence of a particle growth inhibitor yields a pigmentary quinacridone solid solution. Since solid solutions are not formed under the present oxidation conditions in the absence of the particle growth inhibitor, it is surprising that the addition of the particle growth inhibitor causes the formation of solid solutions of quinacridones. In addition, it is surprising that the mixtures undergo complete oxidation in the presence of sufficient phthalimidomethylquinacridone particle growth inhibitor to yield pigmentary products directly because it is known that having the particle growth inhibitor present in an mount greater 1.0% inhibits the oxidation of 6,13-dihydroquinacridone to 7-quinacridone. Oxidizing the dihydroquinacridone mixture in the presence of larger mounts of the particle growth inhibitor permits pigmentary forms of the solid solutions to be prepared directly; without the need for additional particle size reducing after treatments.

The primary object of this invention is to provide improved methods for the preparation of pigmentary quinacridone solid solutions. In general, the inventive methods relate to the simultaneous co-oxidation of mixed dihydroquinacridones in the presence of a particle growth inhibitor in order to prepare a pigmentary form of the solid solution directly; eliminating the need for additional particle size reducing after treatments. An additional object of this invention is to provide a method for the direct pigmentary synthesis of α-quinacridone. Various other objects and benefits of the present invention will become apparent from the following descriptions.

DETAILED DESCRIPTION

The present invention most generally relates to a process for the direct preparation of pigmentary solid solutions of quinacridones which comprises oxidizing a mixture of dihydroquinacridones in the presence of a particle growth inhibitor, preferably a phthalimidomethylquinacridone, said particle growth inhibitor being present in an mount sufficient to produce a pigmentary composition directly; without the need for additional particle size reducing after treatments.

In general, the pigmentary product is a solid solution. However, it is also possible to prepare mixtures of quinacridone pigments, which are not in solid solution, by the methods disclosed in this application. The form of the pigmentary composition depends on the conditions of the preparatory process and the ratios and identities of the starting materials.

Generally, the present process is utilized to prepare quinacridone solid solutions. The solid solutions of the present invention include nearly pure quinacridone solid solutions derived from specific ratios of two or more dihydroquinacridones. In addition, if a saturated solid solution is formed, an excess of one of the quinacridones may be present in a free form in combination with the solid solution to form a pigmentary composition. In this application, the solid solutions prepared by the present process include pigmentary compositions containing a solid solution and an excess of at least one component of the solid solution. Such pigmentary compositions are prepared when the dihydroquinacridone corresponding to the excess quinacridone is present during the oxidation of the mixed dihydroquinacridones in an mount in excess of the amount capable of being incorporated into the solid solution. In general, any discussion which relates to the preparation of pigmentary solid solutions, if applicable, will also apply to the preparation of pigmentary compositions comprising a solid solution and an excess of at least one component of the solid solution.

The expressions "direct" or "directly", when used in this application to describe a preparatory process for a pigmentary product, means that the specific surface area of the pigmentary product will be within the range which makes it suitable for use as a pigment, without additional particle size reducing after treatments. Thus, the direct preparatory processes disclosed in this application eliminate the need for further particle size reducing after treatments.

The present process is utilized to directly prepare solid solutions of any ratio of quinacridones capable of forming a solid solution. The present process is especially useful for preparing solid solutions consisting of unsubstituted quinacridone and at least one disubstituted quinacridone.

A variety of compositions containing various ratios of 6,13-dihydroquinacridone and 2,9-dichloro-6,13-dihydroquinacridone can be oxidized in the presence of greater than 1 percent by weight of a phthalimidomethylquinacridone particle growth inhibitor, without inhibition of the oxidation of the 6,13-dihydroquinacridones. Thus, pigmentary solid solutions containing various ratios of quinacridone and 2,9-dichloroquinacridone can be prepared in a pigmentary form without the need for additional particle size reducing after treatments.

The degree of crystallinity of the pigmentary solid solutions is controlled by adding varying amounts of the particle growth inhibitor. The color of the pigmentary solid solutions is controlled by varying the ratios of the dihydroquinacridones in the reaction mixture. Thus, a variety of solid solution pigments can be prepared by the inventive process.

The same approach is used to make a variety of pigmentary solid solutions composed of various combinations of unsubstituted quinacridone and various disubstituted quinacridones or solid solutions composed of two or more disubstituted quinacridones. Solid solutions containing quinacridone in combination with at least one disubstituted quinacridone are very suitable for use as pigments. Suitable disubstituted quinacridones include 4,11-dichloro; 4,11-difluoro; 4,11-dimethyl; 2,9-dimethyl; 2,9-dichloro and 2,9-difluoroquinacridone. Therefore, the inventive process provides a general method for the preparation of pigmentary solid solutions comprising at least two quinacridones; preferably unsubstituted quinacridone and at least one disubstituted quinacridone.

Accordingly, the present invention relates to a general method for the direct preparation of a pigmentary quinacridone solid solution, which comprises oxidizing a mixture of dihydroquinacridones to a pigmentary quinacridone solid solution wherein the oxidation is carded out by heating a reaction mixture comprising the dihydroquinacridone mixture, an alkali metal hydroxide, a water-soluble organic solvent, water and effective amounts of an oxidizing agent and a particle growth inhibitor. Preferably, the dihydroquinacridone mixture will contain 6, 13-dihydroquinacridone and at least one disubstituted dihydroquinacridone in the appropriate ratios.

The particle growth inhibitor must be present in the reaction mixture in order to form a complete solid solution. For instance, the oxidation of a reaction mixture containing 60% 6,13-dihydroquinacridone and 40%, 2,9-dichloro-6,13-dihydroquinacridone in the presence of a particle growth inhibitor yields a product with the unique solid compound X-ray pattern of a 60/40 solid solution of quinacridone and 2,9-dichloroquinacridone prepared by other known procedures. However, when the same oxidation is carded out in the absence of the particle growth inhibitor, the resulting pigment is a chemical mixture, not a solid solution, as indicated by its X-ray diffraction pattern. Thus, the particle growth inhibitor is responsible for both the formation of the solid solution and its pigmentary properties.

Simultaneous co-oxidation of the mixed dihydroquinacridones is also a requirement for the formation of a solid solution or a solid compound. For example, when the reaction mixture contains a small particle size quinacridone and 2,9-dichloro-6,13-dihydroquinacridone, instead of the mixed dihydroquinacridones, the oxidation fails to yield a solid solution.

Thus, the present invention relates to the discovery that a pigmentary solid solution of quinacridones is prepared directly by the simultaneous co-oxidation of mixed dihydroquinacridones in the presence of an effective amount of a particle growth inhibitor. An effective amount of a particle growth inhibitor is an amount which is sufficient to directly produce particles having a surface area suitable for use as a pigment.

A particle growth inhibitor is a compound which slows and ultimately inhibits the growth of the particles produced by the present oxidation reaction. Such compounds are well-known in the pigments art. The slow growth of the pigment particles, which is effected by the particle growth inhibitor, is believed to promote the formation of the solid solution because it provides the opportunity for the mixed quinacridones to dissolve into one another when small particles are initially generated and allowed to ripen slowly during the heating period.

The preferred particle growth inhibitors are phthalimidomethylquinacridone compounds of the formula

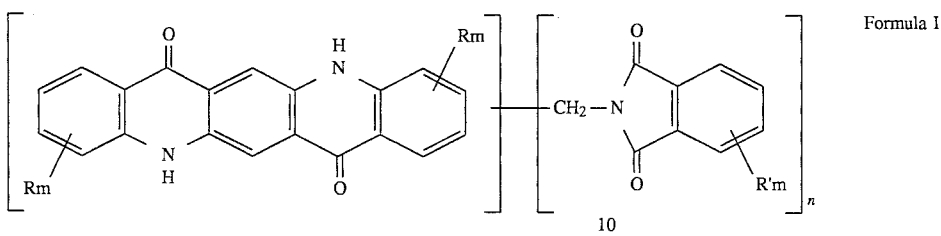

Formula I wherein R and R' are each independently hydrogen, halogen, $C_1$–$C_5$-alkyl and $C_1$–$C_5$-alkoxy, m is zero 1 or 2 and n is 1 or 2. Halogen substituents are, for example, fluorine, chlorine or bromine, in particular chlorine. Alkyl and alkoxy substituents include methyl, ethyl, n-propyl, isopropyl, n-butyl, sec-butyl, tert-butyl, n-pentyl isopentyl, neopentyl, or tert-pentyl. Preferred compounds of formula I are those wherein R and R' are hydrogen and n is 1. 2-phthalimidomethylquinacridone is a particularly preferred particle growth inhibitor.

In addition, under the alkaline reaction conditions utilized for the oxidation of the disubstituted dihydroquinacridone, any of the phthalimidomethylquinacridone particle growth inhibitors can be at least partially hydrolyzed to an open amide carboxylate anion as shown for the unsubstituted case in the following reaction scheme:

Depending on the particle size of the desired pigment, inclusion of as little as 0.1% or as much as 10% of particle growth inhibitor relative to the weight of the dihydroquinacridone mixture can be used. Although the particle growth inhibitor can be present in amounts greater than 10%, using more than 10% additive does not serve a useful purpose. In particular, it is essential to use an amount of particle growth inhibitor which is effective to directly yield a pigmentary solid solution.

A variety of pigments with varying degrees of particle size and transparency, require a range of 1.1% to about 10% of a phthalimidomethylquinacridone particle growth inhibitor of formula I. A preferred range of phthalimidomethylquinacridone particle growth inhibitor incorporated during the oxidation of the dihydroquinacridone mixture to produce a pigmentary solid solution is from the minimum amount effective to prepare the solid solution with pigmentary

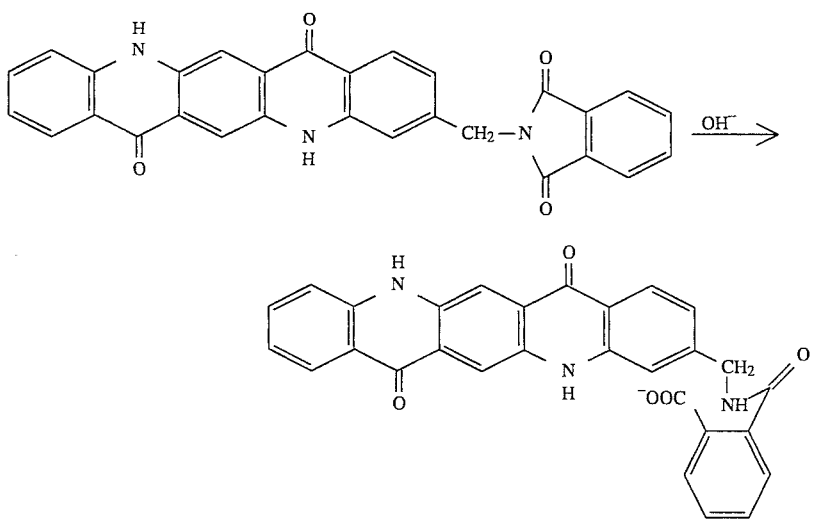

Therefore, the present invention also relates to the oxidation of the mixed dihydroquinacridones in the presence of a hydrolysis product of a phthalimidomethylquinacridone particle growth inhibitor of formula I. The hydrolysis product is normally in the form of a salt of the α-carboxybenzamidomethylquinacridone which corresponds to a hydrolyzed phthalimidomethylquinacridone particle growth inhibitor of formula I.

The phthalimidomethylquinacridone particle growth inhibitors utilized in the present process can be prepared by known methods, for example, by reaction of a quinacridone with a phthalimide and paraformaldehyde in concentrated sulfuric acid. U.S. Pat. No. 3,275,637, which is here incorporated by reference, discloses the preparation of phthalimidomethylquinacridone particle growth inhibitors.

properties up to about 6 percent by weight of the particle growth inhibitor, for example from 2%, 3% or 4% by weight up to about 6% by weight, preferably from about 3% or 4% to about 6%. The most useful range of phthalimidomethylquinacridone particle growth inhibitor is up to about 5% by weight, for example from 2% to about 5%, or about 3% to about 5%, or about 4% to about 5% by weight of the particle growth inhibitor.

The surface area of the pigmentary product is directly related to the amount of the particle growth inhibitor present during the oxidation. Thus, the surface area of the product will increase as the amount of particle growth inhibitor increases.

In order for a solid solution to be suitable for use as a pigment, the surface area is at least 15 meters$^2$/gram and as high as 90 m$^2$/gram. The preferred range for the surface area is preferably from about 20 to about 90 m$^2$/gram, most preferably from about 30 to about 70 m²/gram. The surface area being measured by nitrogen absorption or another suitable method.

The oxidation of the dihydroquinacridone mixture to a pigmentary solid solution is conveniently carried out by stirring a slurry containing two or more dihydroquinacridones, water, a water soluble organic solvent and an alkali metal hydroxide to form a reaction mixture. The reaction mixture must be sufficiently basic to form the di-alkali metal salts of all of the dihydroquinacridones in the mixture. After formation of the alkali metal salts of the dihydroquinacridones, the oxidizing agent is added to the mixture. The reaction mixture is then heated. According to the inventive process, the reaction mixture will contain a particle growth inhibitor, preferably a phthalimidomethylquinacridone of formula I. Thus, the present invention relates to a process for the direct preparation of a pigmentary quinacridone solid solution, which comprises oxidizing a dihydroquinacridone mixture to the corresponding quinacridone solid solution by heating a reaction mixture comprising the dihydroquinacridone mixture, a water-miscible organic solvent, an alkali metal hydroxide, water and effective amounts of an oxidizing agent and a particle growth inhibitor, preferably a phthalimidomethylquinacridone particle growth inhibitor.

The particle growth inhibitor is effective if it is incorporated into the reaction mixture anytime prior to the addition of the oxidizing agent. Typically, it is convenient to add the particle growth inhibitor along with the dihydroquinacridones.

The organic solvent is any solvent which is miscible with water and is effective in promoting salt formation and subsequent oxidation of the mixed dihydroquinacridone salts to the desired solid solution. Preferably, the organic solvent is a water-miscible alcohol, for example a $C_1$–$C_3$ alkanol, or a dihydroxy solvent, such as the ethylene glycols and their monoethers. Methanol, ethanol and all of the propanols are suitable alkanols. Most preferably, the organic solvent is methanol.

The organic solvent will be present in an amount required to promote formation and solubilization of the dihydroquinacridone salts. Generally, the organic solvent will be present in an amount which is at least 3 times the weight of the dihydroquinacridones in the mixture, for example from about 3.6 to about 4.8 parts by weight of organic solvent per part of dihydroquinacridones in the reaction mixture. Of course, the amount of solvent required will vary depending on a number of factors, such as the solubility of the dihydroquinacridones in the particular solvent and the identity of the alkali metal hydroxide.

The alkali metal hydroxide is, for example, sodium or potassium hydroxide, preferably potassium hydroxide. The alkali metal hydroxide is generally added in the form of a concentrated aqueous solution. However, solid alkali metal hydroxide is also suitable for addition to the reaction mixtures. The alkali metal hydroxide must be present in at least the amount required to form the di-alkali metal salts of all of the dihydroquinacridones present in the reaction mixture. In general, the molar ratio of the alkali metal hydroxide to the dihydroquinacridones in the mixture is at least about 7:1 or higher, for example 7:1 to 25:1, preferably 8:1 to 16:1, most preferably about 9:1 to 14:1. For example, the reaction mixtures typically contain from about 2.7 to about 4.8 parts by weight of 45% potassium hydroxide per part of the dihydroquinacridones.

Generally, the reaction mixture contains sufficient water to promote the formation of the alkali metal salts of the mixed dihydroquinacridones and to keep the water-soluble oxidizing agent in solution in the reaction mixture. Normally, only a minor amount of water is added in addition to any water present in the alkali metal hydroxide solution. However, larger amounts are added if the alkali metal hydroxide is added in solid form.

Any oxidizing agent capable of oxidizing the dihydroquinacridone mixture under the given reaction conditions can be utilized. Preferably, the oxidizing agent is a water-soluble compound. For example, many water-soluble, nitro-substituted aromatic sulfonic and carboxylic acids are suitable oxidizing agents. The oxidizing agent should be present in an amount effective to completely oxidize all of the dihydroquinacridones in the dihydroquinacridone mixture.

The most common and most preferred oxidizing agents are the water-soluble salts of m-nitrobenzenesulfonic acid, most preferably the sodium salt. If sodium m-nitrobenzenesulfonate is utilized as the oxidizing agent, it will usually be present in an amount ranging from 0.5 to 1 part per part by weight of the dihydroquinacridone mixture. The preferred range is from about 0.5 to about 0.75 parts, most preferably 0.6 parts, per part by weight of the dihydroquinacridone mixture.

After the oxidizing agent is added, the mixture is heated to a temperature of from 50° C. to reflux for a specified length of time, generally from about 2 hours to about 8 hours. Preferably, the reaction mixture is heated to reflux for about three hours. The duration of reflux is important since excessive reflux periods can result in undesirable pigment crystal growth.

The general work-up after the oxidation reaction is completed involves dilution of the reaction mixture with water or methanol and isolation of the pigmentary solid solution by filtration followed by washing with water until the pH of the filtrate is less than about 8.

The pigments prepared by using the inventive process are comparable to the corresponding pigments prepared by using known multistep procedures such as milling/grinding, followed by organic solvent treatment or acid pasting.

The composition of the dihydroquinacridones in the reaction mixture controls the color of the resulting pigmentary solid solution. Preferred compositions will be prepared from a reaction mixture containing unsubstituted dihydroquinacridone and at least one disubstituted dihydroquinacridone.

In general, any ratio of unsubstituted dihydroquinacridone to disubstituted dihydroquinacridone can be utilized. As a practical matter, the unsubstituted dihydroquinacridone is generally present in the range from about 5 to about 70 percent by weight of the dihydroquinacridone mixture and the disubstituted dihydroquinacridone is generally present in the range from about 30 to about 95 percent by weight of the dihydroquinacridone mixture. The composition of the dihydroquinacridone mixture controls whether the resulting pigmentary product is a solid solution, a solid compound or a pigmentary composition with an excess of one of the quinacridone components.

The concentration of the particle growth inhibitor present during the oxidation controls the particle size and/or surface area of the resulting pigmentary product. For example, when a reaction mixture containing 10 parts of 6,13-dihydroquinacridone and 90 parts of 2,9-dichloro-6,13-dihydroquinacridone is oxidized in the presence of varying concentrations of particle growth inhibitor, there is a clear trend wherein the particle size is inversely proportional to the amount of particle growth inhibitor. Thus, the pigmentary products prepared in the presence of 3%, 4% and 5% of the particle growth inhibitor are clearly distinguishable from each other in masstone darkness and transparency, the pigmentary product prepared in the presence of 5% particle growth inhibitor being the darkest and most transparent.

The color of the solid solution is controlled by the composition of the dihydroquinacridones in the reaction mixture. For example, changing the composition of the reaction mixture from 10/90 to 20 pans 6,13-dihydroquinacridone and 80 pans 2,9-dichloro-6,13-dihydroquinacridone alters the color, shifting it to a yellower shade. The 20/80 compositions show the same relationship between concentration of particle growth inhibitor and particle size and a similar masstone darkness and transparency trend as in the 10/90 compositions.

Solid solutions are prepared by using up to 20% 6,13-dihydroquinacridone, the balance being 2,9-dichloro-6,13-dihydro-quinacridone, at any level between 3–5% of particle growth inhibitor. The procedure yields a pigmentary solid solution with an X-ray pattern corresponding to that of γ-phase 2,9-dichloroquinacridone. In these compositions, the individual components appear like Guest-Host molecules. The Host molecule is clearly 2,9-dichloroquinacridone in its γ-crystal phase. However, when the ratio of 6,13-dihydroquinacridone to 2,9-dichloro-6,13-dihydroquinacridone in the reaction mixture is adjusted to from 45/55 to 70/30, the pigment obtained is not only a solid solution but a solid compound since the X-ray pattern of the product is different from those of quinacridone or 2,9-dichloroquinacridone. The remaining ranges of compositions result in X-ray patterns that can be characterized as pigmentary compositions containing the solid solution and an excess of one of the quinacridones in the solid solution. The pigments derived from a reaction mixture containing 6,13-dihydroquinacridone in combination with 2,9-dichloro-6,13-dihydroquinacridone, will possess pigmentary properties whether the product is a solid solution, a solid compound or a pigmentary composition containing a solid solution or a solid compound and an excess of one of the quinacridones. Similar trends are found when other disubstituted dihydroquinacridones are used in place of 2,9-dichloro-6,13-dihydroquinacridone.

In addition to the above indicated process for directly preparing pigmentary quinacridone solid solutions, the present invention also relates to a process for the direct preparation of pigmentary α-quinacridone, which comprises oxidizing 6,13-dihydroquinacridone to pigmentary α-quinacridone by heating a reaction mixture comprising the 6,13-dihydroquinacridone, an alkali metal hydroxide, a water soluble organic solvent, water and effective mounts of an oxidizing agent and a particle growth inhibitor, said particle growth inhibitor being present in an mount ranging from 2 to about 10 percent by weight, based on the weight of the 6,13-dihydroquinacridone, and wherein the molar ratio of alkali metal hydroxide to the dihydroquinacridones is at least 8:1, wherein said particle growth inhibitor is a compound of the formula wherein R and R' are each independently hydrogen, halogen, $C_1$–$C_5$-alkyl and $C_1$–$C_5$-alkoxy, m is zero, 1 or 2 and n is 1 or 2, or a hydrolysis product thereof. All of the reaction conditions utilized for the direct preparation of pigmentary α-quinacridone are the same as those described above for the direct preparation of the pigmentary mixtures.

The pigments prepared by the present process are suitable for use as pigments for coloring high molecular weight organic materials. High molecular weight organic materials which can be colored or pigmented with the products according to the invention are, for example, cellulose ethers and esters, such as ethylcellulose, nitrocellulose, cellulose acetate or cellulose butyrate, natural and synthetic resins, such as polymerization or condensation resins, such as amino resins, in particular urea- and melamine-formaldehyde resins, alkyd resins, phenolic resins, polycarbonates, polyurethanes, polystyrene, polyvinyl chloride, polyamides, polyolefines, polyesters, ABS, polyphenylene oxide, rubber, caseine, silicone and silicone resins, individually or mixed together with one another.

The high molecular weight organic compounds mentioned can be present individually or in mixtures as plastic materials, melts or in the form of spinning solutions, lacquers, paints or printing inks. Based on the high molecular weight organic material to be pigmented, the pigments according to the invention can be used in an amount of 0.01 to 30% by weight, preferably 0.1 to 10% by weight.

The high molecular weight organic substances are pigmented with the pigments prepared by the present processes by known methods, for example, by mixing the pigment, if desired in the form of a masterbatch, into these substrates using roll mills and mixing or grinding apparatus. The pigmented material is then brought into the desired final form by known methods, such as calendering, pressing, extruding, brushing, casting or injection molding. It may be desirable to incorporate plasticizers into the high molecular weight compounds before the shaping operation in order to produce non-rigid moldings or to reduce their brittleness. Suitable plasticizers are, for example, esters of phosphoric acid, phthalic acid or sebacic acid. Plasticizers can be incorporated before or after the incorporation of the solid solutions according to the invention into the polymers. To obtain different shades, it is further possible to add fillers or other coloring constituents, such as white, colored, or black pigments, in any desired amounts, to the high molecular weight organic substances, in addition to the pigments according to this invention.

The pigments prepared by the present process are particularly suitable for coloring polyvinyl chloride and polyolefins, such as polyethylene and polypropylene, and for pigmenting lacquers and paints, in particular automotive topcoats. When used for this purpose, the pigments prepared by the present process possess good general pigment properties, such as high dispersability, high tinctorial strength and purity and high migration, heat, light and weathering fastness properties.

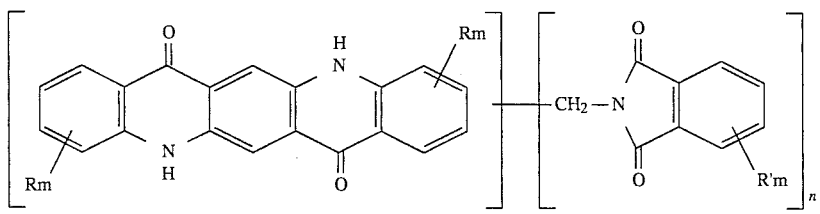

The following examples are intended to further illustrate, but not to limit, the embodiments of the present invention. All parts are given by weight unless otherwise specified. All percentages of the 2-phthalimidomethylquinacridone particle growth inhibitors in this application are by weight relative to the weight of the dihydroquinacridone mixture, as are all other percentages in this application, unless specified otherwise. The width at half height of the x-ray diffraction peaks, $\beta_{½}$, is in arbitrary units and is utilized as an indicator of relative particle size, whereby a higher $\beta_{½}$ indicates a smaller particle size.

EXAMPLE 1

To a two liter four-necked round bottom flask equipped with a thermometer, a stirrer and a reflux condenser are added 6,13-dihydroquinacridone (48.0 g; 0.153 moles), 2,9-dichloro-6,13-dihydroquinacridone (32.0 g; 0.084 moles), 2-phthalimidomethylquinacridone (4.0 g; 5% based on weight) and methanol (404 ml). To this slurry is added in a thin stream, with stirring, an aqueous solution of potassium hydroxide (318.8 g; 45%) maintaining the temperature below 60° C. for 15 minutes and to this is added powdered sodium m-nitrobenzenesulfonate (46 g) followed by water (52 ml). The reaction mixture is heated to reflux for 3 hours and then diluted with water to bring the pot temperature to 60°–65° C. The resulting thick slurry is filtered, washed with hot water until the pH of the filtrate is less than 8 and the conductivity is less than 110% of the wash water. The resulting pigment is dried at 80° C. and characterized by its X-ray diffraction pattern; full width at half maximum height, $\beta_{½}$ of the 6.0 2$\Theta$ peak and a rubout evaluation.

The x-ray pattern shows that the resulting pigment is a solid compound with a quinacridone to 2,9-dichloroquinacridone ratio of 60:40. The $\beta_{½}$ of the peak at 6.0 2$\Theta$ is 0.516. By rubout the pigment displayed a very attractive yellow shade magenta color.

EXAMPLE 1a

The procedure of Example 1 is repeated except that 2-phthalimidomethylquinacridone is excluded.

The resulting pigment is not a solid solution and showed an X-ray pattern characteristic of a mixture of pigments. By rubout this pigment is very dull and very weak.

EXAMPLE 2

Crude beta quinacridone (468 g) and anhydrous sodium sulfate (82.5 g) are added to a mill. The mill is fitted with L-arms and charged with 3.78 liters of 0.6 cm diameter ceramic grinding media. The mill is rotated at 500 RPM. At the conclusion of the milling, the millpowder is recovered by opening the valve at the bottom of the mill while rotation is continued for 15 minutes.

EXAMPLE 2a

To a one liter four-necked round bottom flask equipped with a thermometer, a stirrer and a reflux condenser are added premilled beta-quinacridone prepared according to Example 2 (28.24 g; actual pigment 24.0 g), 2,9-dichloro 6,13-dihydroquinacridone (16.0 g), 2-phthalimidomethylquinacridone (2.0 g; 5.0% on weight basis) and methanol (202 ml). To this slurry is added, in a thin stream, with stirring, an aqueous solution of potassium hydroxide (159.4 g; 45%) maintaining the temperature below 60° C. The above mixture is stirred at 50°–60° C. for 15 minutes and to this is added powdered sodium m-nitrobenzene sulfonate (23 g) followed by water (26 ml). The reaction mixture is heated to reflux for 3 hours and then diluted with water to bring the pot temperature to 60°–65° C. The resulting thick slurry is filtered, washed with hot water until the pH of the filtrate is less than 8 and the conductivity is less than 110% of the wash water. The resulting pigment is dried at 80° C. and is characterized by its X-ray diffraction pattern and a rubout evaluation.

The pigment prepared according to this example did not show the characteristic 60/40 quinacridone/2,9-dichloroquinacridone solid solution X-ray pattern, instead it appeared as a mixture of pigments, still showing significant amounts of beta-quinacridone which was not in the solid solution. By rubout the pigment displayed a dark masstone and a yellowish dull tint.

EXAMPLE 3

To a one liter four-necked round bottom flask equipped with a thermometer, a stirrer and a reflux condenser are added 6,13-dihydroquinacridone (4.0 g; 0.0127 moles), 2,9-dichloro-6,13-dihydroquinacridone (36.0 g; 0.094 moles), 2-phthalimidomethylquinacridone (2.0 g; 5.0% based on weight) and methanol (202 ml). To this slurry is added, in a thin stream, with stirring, an aqueous solution of potassium hydroxide (159.4 g; 45%) maintaining the temperature below 60° C. The above mixture is stirred at 50°–60° C. for 15 minutes and to this is added powdered sodium m-nitrobenzenesulfonate (23 g) followed by water (26 ml). The reaction mixture is heated to reflux for 3 hours and then diluted with water to bring the pot temperature to 60°–65° C. The resulting thick slurry is filtered, washed with hot water until the pH of the filtrate is less than 8 and the conductivity is less than 110% of the wash water. The resulting pigment is dried at 80° C. and is characterized by its X-ray diffraction pattern; $\beta_{½}$ of the peak at 27.8 2$\Theta$ and a rubout evaluation.

The pigment prepared according to this example showed an X-ray diffraction pattern of a $\gamma$-phase 2,9-dichloroquinacridone. The $\beta_{½}$ of the peak at 27.8 2$\Theta$ is 0.704. The rubout evaluation revealed an attractive deep masstone and an intense strong tint, comparable to a similar commercial pigment prepared by special finishing techniques.

EXAMPLE 4

To a two liter four-necked round bottom flask equipped with a thermometer, a stirrer and a reflux condenser are added 6,13-dihydroquinacridone (16.0 g; 0.051 moles), 2,9-dichloro-6,13-dihydroquinacridone (64.0 g; 0.167 moles), 2-phthalimidomethylquinacridone (4.0 g; 5.0% based on weight) and methanol (404 ml). To this slurry is added, in a thin stream, with stirring, an aqueous solution of potassium hydroxide (318.8 g; 45%) maintaining the temperature below 60° C. The above mixture is stirred at 50°–60° C. for 15 minutes and to this is added powdered sodium m-nitrobenzenesulfonate (46 g) followed by water (52 ml). The reaction mixture is heated to reflux for 3 hrs. The reaction workup and the characterization of the resulting pigment is done as described in Example 3.

The solid solution of the resulting 20/80 composition of quinacridone and 2,9-dichloroquinacridone showed an X-ray diffraction pattern of a $\gamma$-2,9-dichloroquinacridone with a $\beta_{½}$ of the peak at 27.8 2$\Theta$ of 0.772. By rubout this pigment is a very close color match to the pigment prepared according to Example 3.

EXAMPLE 5

Following the procedure described in Example 4, a 25/75 composition pigment is prepared using 6,13-dihydroquinacridone (20.0 g), 2,9-dichloro-6,13-dihydroquinacridone (60.0 g) and 2-phthalimidomethylquinacridone (4.0 g). The resulting pigment showed an X-ray pattern of predominantly γ-phase 2,9-dichloroquinacridone and a β½ of 0.711 of the band at 27.8 2Θ. Evaluation of the pigment by rubout indicated an intense yellow shade magenta color significantly yellower than the pigment according to Example 4.

EXAMPLE 6

The 40/60 pigment derived via the oxidation of 6,13-dihydroquinacridone (32.0 g), 2,9-dichloro-6,13-dihydroquinacridone (48.0 g) and 2-phthalimidomethylquinacridone (4.0 g) following the procedure for Example 4 is a mixture of a solid solution and excess 2,9-dichloroquinacridone pigments with a β½ of the peak at 27.8 2Θ of 0.772 in its X-ray pattern. By rubout this pigment showed a very attractive yellow shade magenta color.

EXAMPLE 7

Example 4 is repeated with the exception that 2.4 g, instead of 4.0 g of 2-phthalimidomethylquinacridone is used during the oxidation resulting in a solid solution pigment which showed an X-ray diffraction pattern of γ-phase 2,9-dichloroquinacridone similar to Example 4 except the β½ of the 27.8 2Θ peak is 0.621 indicating a larger particle size pigment compared to Example 4. A lighter masstone by rubout also confirms a larger particle size pigment compared to Example 4.

EXAMPLE 8

To a one liter four-necked round bottom flask equipped with a thermometer, a stirrer and a reflux condenser are added 6,13-dihydroquinacridone (40.0 g; 0.127 moles) and methanol (210 ml). To this slurry is added with stirring an aqueous solution of sodium hydroxide (52.8 g; 50%) maintaining the temperature below 55° C. The above mixture is stirred at 50°-55° C. for 1 hour and to this is added powdered sodium m-nitrobenzenesulfonate (24 g) followed by water (27 ml). The reaction mixture is heated to reflux for 2 hours and then diluted with water to bring the pot temperature to 60°-65° C. The resulting thick slurry is filtered, washed with hot water until the pH of the filtrate is less than 8.5 and the conductivity is less than 110% of the water being used to wash. The pigment thus obtained is dried at 80° C. and is characterized by its X-ray diffraction pattern, the full width at half maximum height of the peak at 6.0 2Θ and a rubout evaluation. Analysis shows that the quinacridone product is present in 98.5% purity.

The crude product, according to this example, showed a typical β-quinacridone X-ray diffraction pattern with a $β_{1/2}$ of the peak at 6.0 2Θ of 0.292. By rubout it showed a light, dull masstone and a very weak tint.

EXAMPLE 9

A procedure described for Example 8 is followed except 0.8 g of 2-phthalimidomethylquinacridone is included in the reaction mixture. The pigment obtained showed an altogether different X-ray diffraction pattern similar to α-quinacridone with a β½ of the 6.3 2Θ peak of 0.464. By rubout showed a brilliant yellowish red masstone and an intense yellower tint of equal strength when compared to a small particle γ-quinacridone. Analysis shows that the α-quinacridone product is present in 95.1% purity.

EXAMPLE 10

Pigment Preparation for Paints (A) The wet pulp of the pigment according to Example 4 is blended with a wet pulp of the aluminum salt of quinacridone-monosulfonic acid (4.0% by weight on dry basis) and the resulting pigment is isolated, dried, pulverized and used in a paint formulation.

(B) Pigment Dispersion

A pint jar is charged with 26.4 g of the above pigment prepared in (A), 66.0 g of an acrylourethane resin, 14.4 g of a dispersant resin and 58.2 g of a solvent (thinner). The mixture is milled using 980 g of grinding media for 64 hrs. to prepare the pigment base containing 16% pigment and 48% solids at a pigment to binder ratio of 0.5.

(C) Aluminum Base

The aluminum base is obtained by mixing 405 g of aluminum paste (SPARKLE SILVER 5242-AR from SIMBERLINE) with 315 g of acrylic dispersion resin and 180 g of acrylic resin in a quart can with an air mixer at slow to medium speed until lump-free (1–2 hrs.).

(D) Metallic Clear Solution

Add 1353 g. of a non-aqueous dispersion resin, 786.2 g of melamine resin, 144.6 g xylene, 65.6 g of a UV screener solution and 471.6 g acrylourethane resin, in the order indicated and mix thoroughly with an air mixer for 15 minutes. Continue mixing and add slowly 89.0 g of a premixed solution of an acid catalyst and 90.0 g methanol to insure the solution is thoroughly incorporated.

(E) Metallic Paint Formulation

The basecoat paint is prepared by mixing 35.5 g of the pigment base described above, 5.1 g aluminum base, 5.3 g non-aqueous dispersion resin and 54.1 g metallic clear consisting of 7.1% pigment and 54.4% solids with a pigment to binder ratio of 0.15.

(F) Aluminum panels treated with grey acrylic primer are sprayed with two coats of the basecoat paint to a film thickness of 15–20 microns on a dry film basis. The two sprayings are spaced by a 90-second flash at room temperature. After a flash of 3 minutes, the acrylic clear topcoat is applied by spraying two coats (90 seconds flash between coats) to a film thickness of 37–50 microns on a dry film basis. The panels are dried for 10 minutes at room temperature and baked at 120° C. for 30 minutes.

The resulting coating exhibits an attractive, aesthetically pleasing intense color with excellent two-tone and excellent lighffastness.

EXAMPLE 11

To a one liter four-necked round bottom flask equipped with a thermometer, a stirrer and a reflux condenser are added 6,13-dihydroquinacridone (4.0 g; 0.0127 moles), 2,9-dimethyl-6,13-dihydroquinacridone (36.0 g; 0.106 moles), 2-phthalimidomethylquinacridone (1.6 g; 4% based on weight) and methanol (319 ml). To this slurry is added in a thin stream, with stirring, an aqueous solution of potassium hydroxide (41.9 g; 45%) followed by solid potassium hydroxide flakes (85 g) in small portions, maintaining the temperature below 60° C. The resulting thick slurry is stirred at 50°–60° C. for 1 hour. To this reaction mixture is added powdered sodium meta-nitrobenzenesulfonate (23.0 g) followed by water (26 ml.). The reaction mixture is heated to reflux for 2 hours and then diluted with water to bring the pot temperature to 60°–65° C. The resulting slurry is filtered, washed with hot water until the pH of the filtrate is less than 8.5 and the conductivity less than 110% of the wash water. The pigment is dried at 80° C. and is characterized by its X-ray diffraction pattern and β½ of the peak at 5.6 2Θ.

The solid solution pigment shows a typical β-phase 2,9-dimethylquinacridone X-ray pattern with a β½ of 0.352 of the peak at 5.6 2Θ and by rubout showed an attractive intense yellow shade magenta color.

EXAMPLE 12

Following the procedure described for Example 11, a 25/75 solid solution of quinacridone and 2,9-dimethylquinacridone is prepared using 10 grams of 6,13-dihydroquinacridone, 30 grams of 2,9-dimethyl-6,13-dihydroquinacridone and 1.6 grams of 2-phthalimidomethylquinacridone.

The resulting solid solution displayed an X-ray pattern similar to that of Example 11 with a β½ at the 5.6 2Θ peak of 0.358 and by rubout is yellower and more intense than the pigment of Example 11.

EXAMPLE 13

A procedure described for Example 8 is followed except that 24 grams of 6,13-dihydroquinacridone, 16 grams of 4,11-dichloro-6,13-dihydroquinacridone and 0.8 grams of 2-phthalimidomethylquinacridone are used.

The resulting 60/40 solid solution of quinacridone and 4,11-dichloroquinacridone showed a typical X-ray pattern with a β½ of the peak at 6.4 2Θ of 0.313.

EXAMPLE 14

The procedure described for Example 8 is followed except that 24 grams of 6,13-dihydroquinacridone, 16 grams of 4,11-difluoro-6,13-dihydroquinacridone and 0.8 grams of 2-phthalimidomethylquinacridone are used.

The resulting 60/40 solid compound of quinacridone and 4,11-difluoroquinacridone showed an X-ray pattern different from those of the two individual components. By rubout this pigment displayed an attractive scarlet to orange color.

EXAMPLE 15

The procedure described for Example 8 is followed except that 30 grams of 6,13-dihydroquinacridone, 10 grams of 4,11-dimethyl-6,13-dihydroquinacridone and 0.8 grams of 2-phthalimidomethylquinacridone are used.

In its X-ray pattern, the resulting 75/25 solid solution pigment showed a β½ of the 6.5 2Θ peak of 0.354. By rubout, the pigment displayed a scarlet to orange shade.

EXAMPLE 16

A 60/40 solid solution of quinacridone and 2,9-difluoroquinacridone is prepared according to the procedure of Example 1 except that 24 grams of 6,13-dihydroquinacridone, 16 grams of 2,9-difluoro-6,13-dihydroquinacridone and 0.8 grams of 2-phthalimidomethylquinacridone are used.

The pigment showed a typical X-ray pattern that of 2,9-difluoroquinacridone. By rubout the resulting pigment exhibited an attractive yellow shade magenta color.

In addition to the embodiments described above, numerous variations of these embodiments can be made in accordance with this invention.

We claim:

1. A process for the direct preparation of a pigmentary quinacridone solid solution, which comprises oxidizing a mixture of dihydroquinacridones directly to a pigmentary quinacridone solid solution wherein the oxidation is carded out by heating a reaction mixture which is a slurry consisting essentially of the dihydroquinacridone mixture, an alkali metal hydroxide, a water miscible alcohol, water and effective amounts of an oxidizing agent and a particle growth inhibitor for quinacridones; wherein the molar ratio of alkali metal hydroxide to dihydroquinacridones is about 7:1 or greater.

2. A process of claim 1 wherein said particle growth inhibitor is a compound of the formula

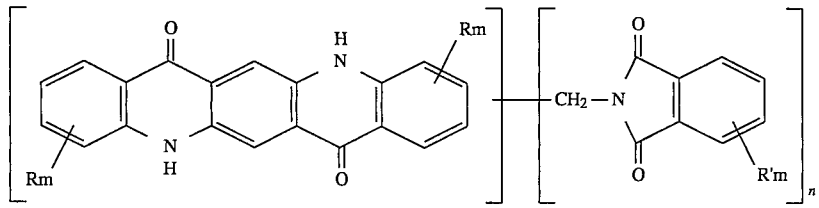

wherein R and R' are each independently hydrogen, halogen, $C_1$–$C_5$-alkyl and $C_1$–$C_5$-alkoxy, m is zero, 1 or 2 and n is 1 or 2, or a o-carboxybenzamidomethylquinacridone hydrolysis product thereof.

3. A process of claim 2 wherein R and R' are hydrogen and n is 1.

4. A process of claim 2 wherein the particle growth inhibitor is 2-phthalimidomethylquinacridone or a hydrolysis product thereof.

5. A process of claim 2 wherein the particle growth inhibitor is present in an mount greater than 1 percent by weight, based on the weight of the dihydroquinacridone mixture.

6. A process of claim 5 wherein the particle growth inhibitor is present in an mount ranging from 2 to about 6 percent by weight, based on the weight of the dihydroquinacridone mixture.

7. A process of claim 1 wherein the water-miscible alcohol is a $C_1$–$C_3$ alcohol or an ethylene glycol or a monoether thereof.

8. A process of claim 7 wherein the water-miscible alcohol is methanol.

9. A process of claim 1 wherein the alkali metal hydroxide is potassium hydroxide.

10. A process of claim 2 wherein the molar ratio of alkali metal hydroxide to dihydroquinacridones is from 8:1 to 16:1.

11. A process of claim 6 wherein the dihydroquinacridone mixture consists of from 5 to 70 percent by weight of 6,13-dihydroquinacridone and from 30 to 95 percent by weight of at least one disubstituted dihydroquinacridone and the molar ratio of alkali metal hydroxide to dihydroquinacridones is greater than 7:1.

12. A process of claim 11 wherein the disubstituted dihydroquinacridone is selected from the group consisting of 4,11-dichloro-6,13-dihydroquinacridone, 4,11-difluoro-6,13-dihydro-quinacridone, 4,11-dimethyl-6,13-dihydroquinacridone, 2,9-dimethyl-6,13-dihydroquinacridone, 2,9-difluoro-6,13-dihydroquinacridone and 2,9-dichloro-6,13-dihydroquinacridone.

13. A process of claim 12 wherein the disubstituted dihydroquinacridone is 2,9-dichloro-6,13-dihydroquinacridone.

14. A process of claim 12 wherein the disubstituted dihydroquinacridone is 2,9-dimethyl-6,13-dihydroquinacridone.

15. A process of claim 12 wherein the disubstituted dihydroquinacridone is 2,9-difluoro-6,13-dihydroquinacridone.

16. A process of claim 12 wherein the pigmentary solid solution is mixed with a pigment derived from an excess of the disubstituted dihydroquinacridone in the reaction mixture.

17. A process of claim 11 wherein the particle growth inhibitor is 2-phthalimidomethylquinacridone or a hydrolysis product thereof, the alkali metal hydroxide is potassium hydroxide, the oxidizing agent is a water-soluble m-nitrobenzenesulfonate salt and the water-miscible alcohol is a $C_1$–$C_3$ alcohol or an ethylene glycol or a monoether thereof.

18. A process of claim 17 wherein the disubstituted dihydroquinacridone is selected from the group consisting of 2,9-dichloro-6,13-dihydroquinacridone, 2,9-dimethyl-6,13-dihydroquinacridone and 2,9-difluoro-6,13-dihydroquinacridone.

19. A process of claim 17 wherein the organic solvent is methanol and the molar ratio of potassium hydroxide to dihydroquinacridones is from 8:1 to 16:1.

20. A process for the direct preparation of a pigmentary α-quinacridone, which comprises oxidizing 6,13-dihydroquinacridone directly to pigmentary α-quinacridone by heating a reaction mixture consisting essentially of 6,13-dihydroquinacridone, an alkali metal hydroxide, a water miscible organic solvent, water and effective amounts of an oxidizing agent and a particle growth inhibitor; wherein said particle growth inhibitor is present in an amount ranging from greater than 1 to about 10 percent by weight, based on the weight of the 6,13-dihydroquinacridone, molar ratio of alkali metal hydroxide to the dihydroquinacridones is about 7:1 or greater, and wherein said particle growth inhibitor is a compound of the formula

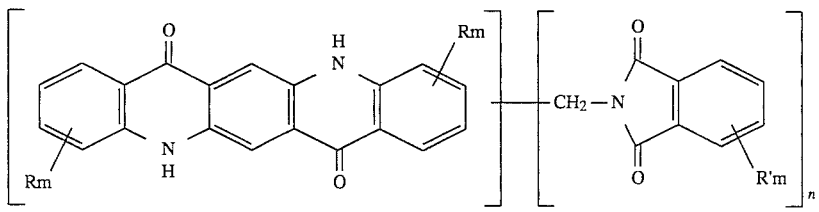

wherein R and R' are each independently hydrogen, halogen, $C_1$–$C_5$-alkyl and $C_1$–$C_5$-alkoxy, m is zero, 1 or 2 and n is 1 or 2, a hydrolysis product thereof.

* * * * *